(12) United States Patent
Wen et al.

(10) Patent No.: US 6,755,740 B2
(45) Date of Patent: Jun. 29, 2004

US006755740B2

(54) METHOD AND SYSTEM FOR IMPLEMENTING A MULTI-WAY GAME

(75) Inventors: Say-Ling Wen, Shanghai (CN); Hua-Feng Mai, Shanghai (CN); David Ho, Taipei (TW)

(73) Assignee: Inventec Appliances Corp., Taipei (TW)

( * ) Notice: Subject to any disclaimer, the term of this patent is extended or adjusted under 35 U.S.C. 154(b) by 134 days.

(21) Appl. No.: 10/216,567

(22) Filed: Aug. 12, 2002

(65) Prior Publication Data

US 2004/0029633 A1 Feb. 12, 2004

(51) Int. Cl.[7] .......................... G09B 3/00; A63F 13/10
(52) U.S. Cl. ..................................... 463/23; 434/332
(58) Field of Search .......................... 463/23; 434/335, 434/323, 322

(56) References Cited

U.S. PATENT DOCUMENTS

| | | | | |
|---|---|---|---|---|
| 5,035,625 A | * | 7/1991 | Munson et al. | 434/332 |
| 5,286,036 A | * | 2/1994 | Barabash | 273/429 |
| 5,716,273 A | * | 2/1998 | Yuen | 463/29 |
| 6,210,272 B1 | * | 4/2001 | Brown | 463/1 |
| 6,554,618 B1 | * | 4/2003 | Lockwood | 434/322 |
| 6,561,901 B1 | * | 5/2003 | Takase | 463/24 |
| 6,604,008 B2 | * | 8/2003 | Chudley et al. | 700/92 |

* cited by examiner

Primary Examiner—Jessica Harrison
(74) Attorney, Agent, or Firm—Rabin & Berdo, P.C.

(57) ABSTRACT

A method and a system for implementing a multi-way game are disclosed, wherein a combination of a learning software and a game software is used, and the user can still perform the game playing procedure. The present invention first divides the game software into a number of game stages, according to the difficulty level or the procedure property of the game software. Then, a source weight for each of a number of game sources needed by each of the game stages is determined, so that a game evaluating module is set up. According to the difficulty level and content of the learning software, a learning weight is respectively determined, so that a learning evaluating module is set up. Next, a related database is set up according to the source weight, the learning evaluating weight, and a transformation function, so that the source weight and the learning evaluating weight can be exchanged to each other. Further still, in each game progress, the user can select an operation on the game software or the learning software, so as to control the game progress. The present invention can provide for the user a more interesting and entertaining learning method by integrating the educational process into the game manner.

8 Claims, 3 Drawing Sheets

METHOD AND SYSTEM FOR IMPLEMENTING A MULTI-WAY GAME

BACKGROUND OF THE INVENTION

1. Field of the Invention

This invention relates to a method and a system for implementing a multi-way game based on a game software platform, and more particularly, the invention relates to a method and a system for implementing a multi-way game with a combination of a game software and an educational software.

2. Description of Related Art

The computer has rather wide applications in the current information environment, and as a result, the graphic image processing and the audio design technology have also been greatly developed in accordance with the backup from the computer system hardware. Therefore, the electronic games have been gradually accepted more widely, and have become one of various entertaining programs for many people in the daily life.

In current kinds of games, the design of the game environment, such as the character roles and multiple scenes, is crucial in offering increasing complexity of the game and more choices to the user. However, strictly speaking, these features are only several changes under the global frame of the game. They remain in one game model, but offer different playing types, without deviating from the concept of game in the end. In this manner, the game utilizes a method for game playing in single way.

Furthermore, some game software with a learning function, in order to attract the user for learning, is designed to have the combination of education with entertainment. However, due to restrictions on the design idea and method, the game with a learning function is generally boring, deficient in entertainment value or becomes a fixed style in the learning process. This cannot achieve the purpose of improving the knowledge and skills of the user.

Then, with the consideration of combining the game software with the learning software, the present invention is to develop a game software with an educational function. It is desired to combine the game playing procedure with some educational contents so that the entertaining effect of playing he game is not reduced at the same time. It can further provide for the user to choose the playing mode in a multi-way.

SUMMARY OF THE INVENTION

It is then an objective of the present invention to provide a method and a system for implementing a multi-way game. The present invention has combined a game software with a learning software, and allows the user to perform some interaction and control on the game playing procedure via an evaluating result by the learning software, so as to accelerate or delay game playing procedure. In addition, the user can also make the selection for only playing the game software, so as to keep the original entertainment purpose.

In accordance with the foregoing and other objectives of the present invention, the invention provides a method for implementing a multi-way game, which is in combination of a learning software and a game software, so as allow the user to play the game progress by multiple ways. The method includes dividing the game software into a number of game stages, according to the level of difficulty or the procedure property of the game software. Then, a source weight for each of a number of game sources needed by each of the game stages is determined, so that a game evaluating module is set up. According to the level of difficulty of the learning software and the content, a learning weight is respectively determined, so that a learning evaluating module is set up. Next, a related database is set up according to the source weight of the game evaluating module and the learning evaluating weight of the learning evaluating module. The source weight and the learning evaluating weight can be exchanged with each other via the related database. Then, in each step of playing the game, the user can select the operation on the game software or the learning software, so as to directly or indirectly control the game progress.

Additionally, in the foregoing step in which the user selects the operation on the game software or the learning software, so as to directly or indirectly control the progress of the game, the step (a) for receiving the selection command that is inputted by the user. If the user selects the operation on the game software, then the method goes to the step (b), and if the user selects the operation on the learning software, then the method goes to the step (d). In the step (b), the user activates a game command from a game interface. Then, in the step (c), the related game data is adjusted, according to the game command. Next, the step (f) is executed. In the step (d), a learning course is provided by a learning interface for the user in learning or answering, so as to produce a first learning weight. Then in the step (e), according to the related database, the first learning weight is transformed into a first source weight so as to exchange a first game source and adjust the related game data. In the step (f), it is judged whether or not the game is to be finished. If it is, then the method goes to the end. If it is not, then the method goes back to the step (a).

In accordance with another objective of the present invention, a system for implementing the multi-way game is also provided. It is in combination of a learning software with a game software, so as to allow the user to select the operation on the game software or the learning software, so as to directly or indirectly control the progress of the game. The system includes a related database and a transforming unit. The related database includes a game evaluating module, a learning evaluating module, and a transformation function, wherein, the game evaluating module is used to record a source weight representing each of the game sources needed by each of the game stages in the game software. Also, the learning evaluating module is used to record a learning weight representing each of the learning courses in the educational software. The source weight and the learning weight have a corresponding relation via a transformation function. The transformation function unit is also used to obtain a learning weight by comparing a score with the learning evaluating module, in which the score is a result obtained from the learning course of the learning software. The learning weight is further transformed into the source weight according to the transformation function stored in the related database, so as to exchange a game source, wherein in each step of the game progress, the system allows the user to select an operation on the game software or learning software. If the user selects the operation on the learning software, then the learning software provides a learning course for the user to learn and answer, so that a first learning weight is obtained. Then, the transforming unit transforms the first learning weight into a first source weight, so as to exchange a first game source and adjust the related game data.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The present invention discloses a method for implementing a multi-way game based on a game software platform, wherein, the user can perform some interaction and control on the playing procedure of the game via setting up a module set of game evaluation and a module set of learning evaluation, so as to achieve the purpose of accelerating or delaying the game playing procedure. In addition, the original function to independently operate the game still remains.

Figure 1:
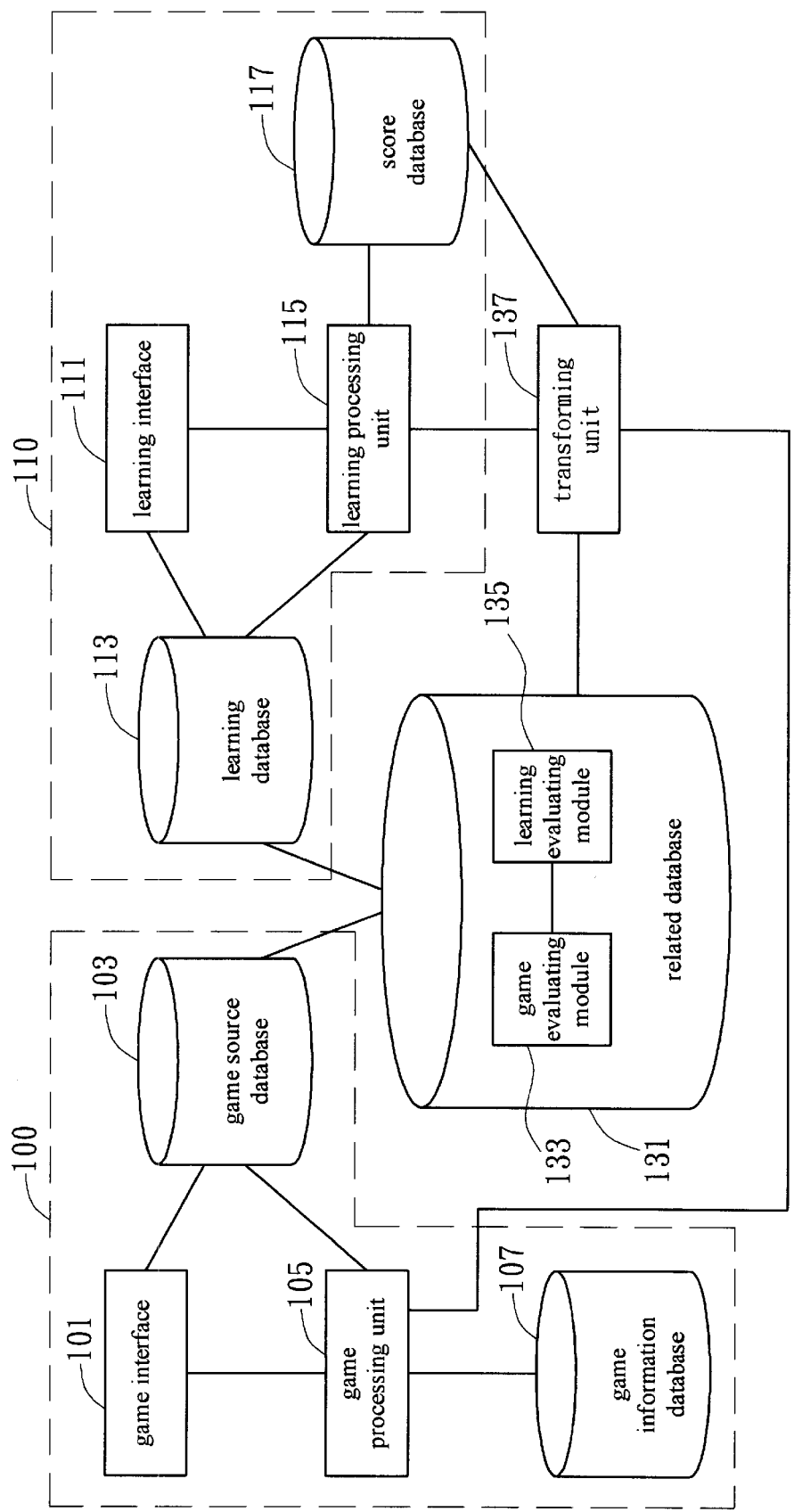
FIG. 1 is a system block diagram, schematically illustrating a method for implementing the multi-way game, according a first embodiment of the present invention.

Referring to FIG. 1, it is a system block diagram, schematically illustrating a method for implementing the multi-way game, according a first embodiment of the present invention. The system uses a combination of the game software 100 and the learning software 110. It also allows for the user to select the operation on the game software 100 or the learning software 110, so as to directly or indirectly control the progress of the game.

As shown in FIG. 1, the game software 100 comprises a game source database 103, game interface 101, a game processing unit 105, and a game information database 107, in which the game source database 103 is used to store the game software 100 and all of the game sources with the game playing rules. The game interface 101 is used to receive a game command that is inputted by the user. The game processing unit 105 is used to adjust the related game data, according to the game command. The game processing unit 105 also determines whether or not the game progress is going to stop, according to the game playing rule. The game information database 107 is used to store the game data.

The learning software 110 includes a learning database 113, a learning interface 111, a learning processing unit 115, and a score database 117, in which the learning database 113 is used to store the course of the learning software 110. Additionally, the learning interface 111 is used to provide the learning course for the user to learn and respond. The learning processing unit 115 is used to produce the score, according to the user's performance. The score database 117 is used to store the score and the learning progressing status of the user.

The system of the present invention comprises the related database 131 and the transforming unit 137. The related database 131 includes a game evaluating module 133, a learning evaluating module 135, and a transformation function (not shown in the drawing), in which the game evaluating module 133 is used to record a source weight representing each of the game sources needed by each of the game stages in the game software 100. Also, the learning evaluating module 135 is used to record a learning weight representing each of the learning courses in the learning software 110. A transformation function is used to allow the source weight and the learning weight to have the corresponding relation.

The transforming unit 137 is used to obtain the learning weight by the evaluation from the learning evaluating module 135 on the score, which is obtained by the user from the learning software 110. In addition, the learning weight is transformed into a source weight via the transformation function stored in the related database 131, so as to exchange for the corresponding one of the game sources.

In the following description, a war game is taken as an example for the game software 110. The learning software 110 is a course for learning English grammar as an example. In this situation, the preferred embodiment of the present invention is, for example, taking a war game that is added with the learning course of the English grammar for the description of the method to implement the multi-way game.

Figure 2:
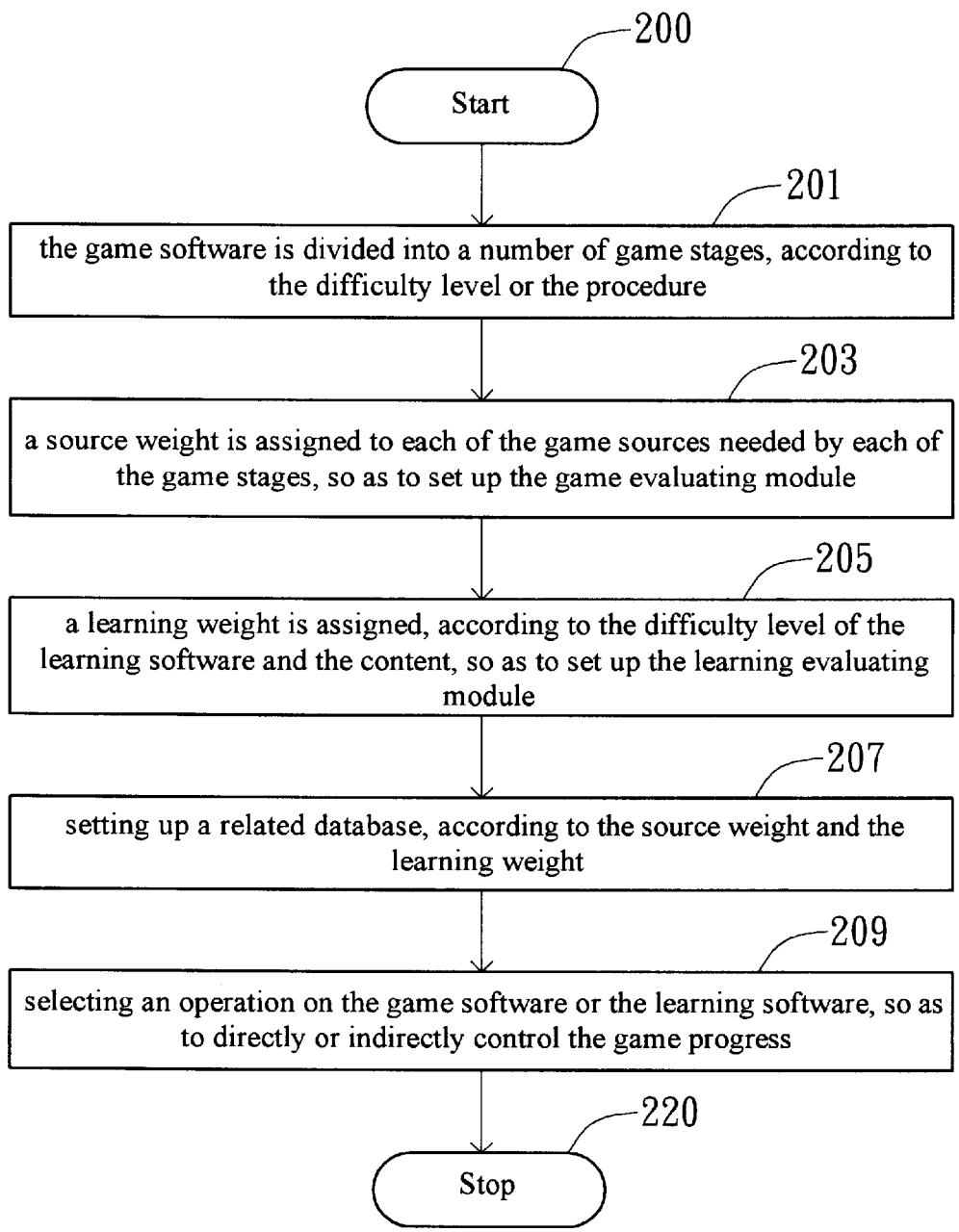
FIG. 2 is a method procedure flow diagram, schematically illustrating the method for implementing the multi-way game, according a first embodiment of the present invention.

At the same time, referring to FIG. 2, it is a procedure flow diagram, schematically illustrating a method for implementing the multi-way game, according a first embodiment of the present invention. As shown in FIG. 2, in the step of 201, the game software 100 (a war game) is divided into a number of game stages, according to the difficulty level or the action step. For example, the game software 100 is based on three level stages of difficulty, and the game progress is divided into cultivation, tax, conscription, training, battle, trading, and so on. Then, the step 203 is executed.

In the step 203, a source weight is assigned to each of the game sources needed by each of the game stages, so as to set up the game evaluating module 133. For example, each of the difficulty levels for the game software 100 needs the game sources of the war strategy book, sword, jewel, strong hose, and so on. Also, in each procedure step for each game stage, each game source is respectively assigned a source weight, so as to set up the game evaluating module 133 as shown in the Table 1, wherein, the cultivation [1] represents the cultivating event with the difficulty level of 1. The battle [3] represents the battle event with the difficulty level of 3. Likewise, each game progress respectively has a specific event.

TABLE 1

| Game source | Source weight |
| --- | --- |
| Cultivating [1] | 10 |
| Tax [1] | 20 |
| Conscription [1] | 30 |
| Training [1] | 40 |
| Battle [1] | 50 |
| Trading [1] | 60 |
| War book [1] | 70 |
| Sword [1] | 80 |
| Jewel [1] | 90 |
| Horse [1] | 100 |
| Cultivating [2] | 100 |
| Tax [2] | 150 |
| Conscription [2] | 200 |
| Training [2] | 250 |
| Battle [2] | 300 |
| Trading [2] | 350 |
| War book [2] | 500 |
| Sword [2] | 550 |
| Jewel [2] | 600 |
| Horse [2] | 650 |
| Cultivating [3] | 1000 |
| Tax [3] | 1500 |
| Conscription [3] | 2000 |
| Training [3] | 2500 |
| Battle [3] | 3000 |
| Trading [3] | 3500 |
| War book [3] | 5000 |
| Sword [3] | 5500 |

TABLE 1-continued

| Game source | Source weight |
|---|---|
| Jewel [3] | 6000 |
| Horse [3] | 6500 |

Then, in the step 205, the learning weight is assigned, according to the difficulty level of the learning software and the content, so as to set up the learning evaluating module 135. For example, the English grammar practice in the learning software 110 has two levels of difficulty, and the practice types include phrase making sentence, word making sentence, bare-type making sentence, advanced phrase making sentence, advanced word making sentence, and advanced bare-type making sentence. A set of learning weights are set up for each of the practice types, according to the difference in the difficulty levels, so that a learning evaluating module 135, as shown in Table 2, is set up, in which the phrase making sentence [2] represents for the questions in the phrase making sentence having the difficulty level of level 2. Likewise, the others have the same meaning.

TABLE 2

| Learning content | Learning weight |
|---|---|
| Phrase making sentence [1] | 10 |
| Word making sentence [1] | 20 |
| Bare-type making sentence [1] | 30 |
| Advanced phrase making sentence [1] | 40 |
| Advanced word making sentence [1] | 50 |
| Advanced bare-type making sentence [1] | 60 |
| Phrase making sentence [2] | 100 |
| Word making sentence [2] | 200 |
| Bare-type making sentence [2] | 300 |
| Advanced phrase making sentence [2] | 400 |
| Advanced word making sentence [2] | 500 |
| Advanced bare-type making sentence [2] | 600 |

Then, the step 207 is executed. In the step 207, according to a transformation function, the source weight of the game evaluating module 133 and the learning weight of the learning evaluating module 135 have been designed to have the corresponding relation, so that a related database 131 is formed. The related database 131 is used to allow the source weight and the learning weight to be transformed to each other. The transformation function is, for example, a relation of "source weight=learning weight" or "source weight= learning weight/2". Then, the step 209 is performed.

Figure 3:
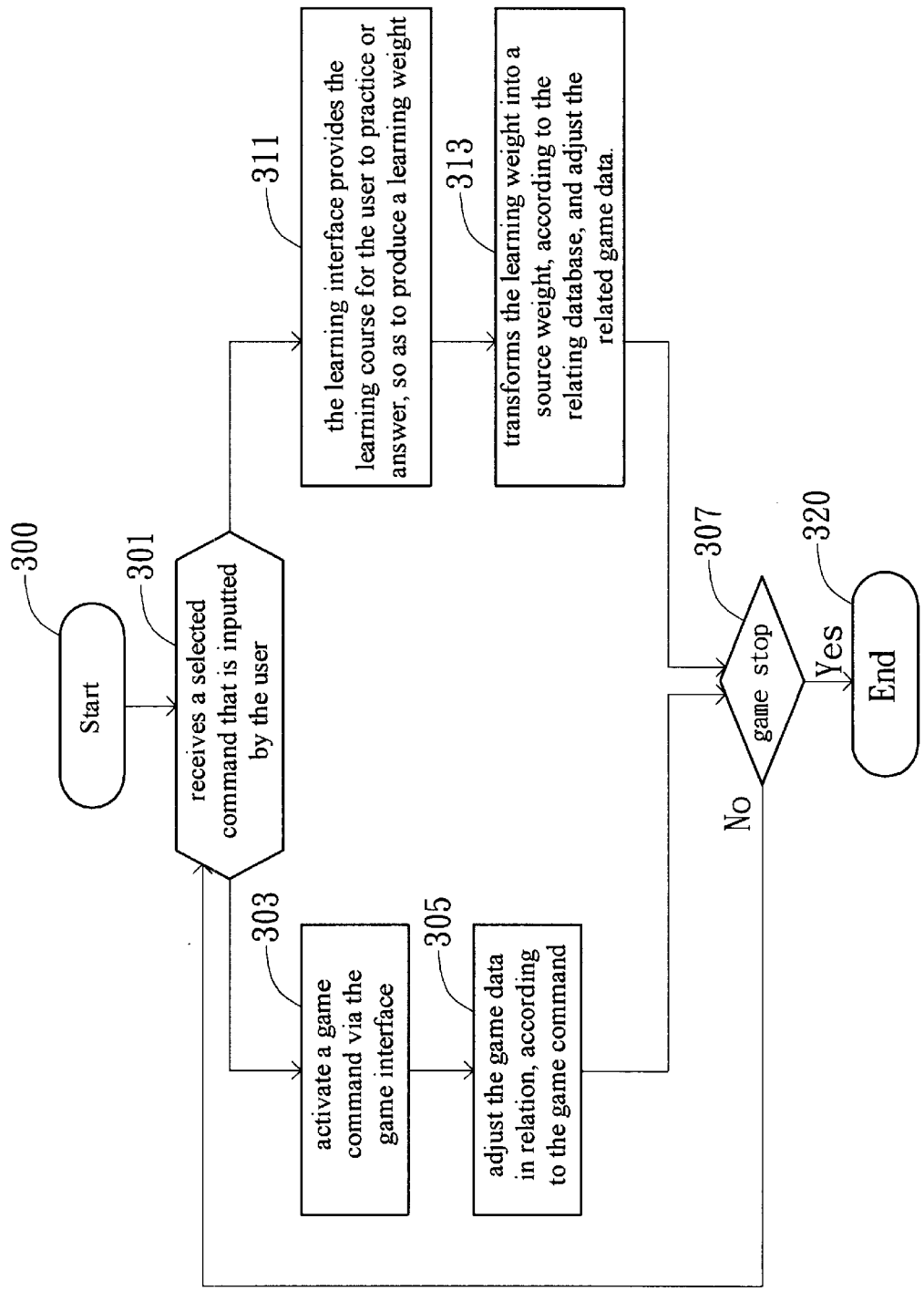
FIG. 3 is a procedure flow diagram, schematically illustrating a method for playing the multi-way game, according a first embodiment of the present invention.

In the step 209, for each the game progress, the user can select the operation on the game software 100 or the learning software 110, so as to directly or indirectly control the game progress. This step is further illustrated in FIG. 3, which is a procedure flow diagram, schematically illustrating a method for playing the multi-way game, according to a first embodiment of the present invention. First in the step 301, the system of the present invention receives a selected command that is inputted by the user, so that the operation on the game software 100 or the learning software 110 is selected. If the user selects the operation on the game software 100, then the step 303 is executed. Otherwise, then the step 311 is executed.

In the step 303, the user can activate a game command via the game interface 101. Then, in the step 305, the game processing unit 305 is used to adjust the related game data in response to the game command that is inputted by the user, according to game sources and the game playing rules recorded in the game information database 103. The game processing unit 105 then further updates the game data having been adjusted to the game information database 107. Then, the step 307 is executed.

In the step 307, the game processing unit 105 also determines whether or not the game progress is going to stop, according to the game playing rules recorded in the game information database 103. If it is, then the method goes to an end; and if it is not, then the method goes back to the step 301 for continuously performing the next game progress.

The descriptions are then made in the following, about the execution for the user in the step 301, in which the user selects to use the learning software 110 to perform the game progress. In the step 311, the learning interface 111 displays the learning course stored in the learning database 113, so as allow the user to proceed the learning action or answer the questions. Next, the learning processing unit 115 evaluates a score, according to the answer results or the learning efficiency. Then the score is stored in the learning database 117 and a learning weight is produced. For example, the user accomplishes the learning course about learning the phase making sentence [1], then a learning weight of 10 is obtained. Next, the step 313 is executed.

In the step 313, the transforming unit 137 transforms the learning weight, obtained by the user during learning, into a source weight, according to the corresponding relation from the related database 131, so that a game source is obtained by exchange. Next, the game processing unit adjusts the related game data, according to the game source, and updates the game information database 107. If the transformation function has the relation of "source weight=learning weight", according to the related database 131, the user having the learning weight of 10 can find the corresponding event of cultivation [1] in the game evaluating module 133, and then this event is activated wile playing the game. If the user has finished the practice of advanced phrase making sentence [1] and obtained a learning weight of 40, then the transforming unit 137 can find some available events for selection corresponding to the game evaluating module 133, in which the available events include cultivation [1], tax [1], conscription [1], and training [1], so as to exchange the corresponding game sources. In this manner, the user can indirectly control the game progress via the learning in the learning software 110. Next, the step 307 is executed, in which the game processing unit 105 judges whether or not the game is to be stop.

Thus, for each game progress, the user can always select the desired game manner or the learning manner to play. As a result, the method can implement the multi-way game. In addition, if the user always selects the game software 100 to play the game in each game progress, then it just performs like the original function in the game software.

In summary, the foregoing description for the embodiment of the present invention discloses the method and the system to implement the multi-way game. It not only maintains the original entertaining effect of the game, but also merges the result from learning the content into the game, so that both the entertaining and learning can be performed at the same time. In this manner, the present invention can allow the user to have more fun and be happier in the learning events. It can also increase the interest and the willingness in learning the content and reduce the tired and boring situations during the educational process and thereby improve the learning efficiency.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for implementing a multi-way game, used to combine a learning software and a game software, and allow a user to play a game progress by multiple ways, the method comprising:

dividing the game software into a plurality of game stages, according to a level of difficulty or a procedure property of the game software;

determining a source weight for each of a plurality of game sources needed by each of the game stages, so that a game evaluating module is set up;

respectively determining a learning weight, according to a level of difficulty of the learning software and a content of the learning software, so that a learning evaluating module is set up;

setting up a related database, according to the source weight of the game evaluating module and the learning weight of the learning evaluating module, so that the source weight and the learning weight can be exchanged with each other via the related database; and selecting an operation on the game software or the learning software, so as to directly or indirectly control the game progress.

2. The method as recited in claim 1, wherein the source weight and the learning weight in the related database are exchanged by a transformation function and have a corresponding relation.

3. The method as recited in claim 1, wherein the learning software comprises a learning interface, and the game software further comprises a game interface, and the step of selecting the operation on the game software or the learning software, so as to directly or indirectly control the game progress further comprises:

(a) receiving a selection command that is inputted by the user, wherein if the user selects the operation on the game software, then the step of (b) is performed; and if the user selects the operation on the learning software, then the step of (d) is performed;

(b) activating a game command from the game interface;

(c) adjusting the related game data, according to the game command, and performing the step of (f);

(d) providing for the user about a learning course to learn and answer, so as to produce a first learning weight;

(e) transforming the first learning weight into a first source weight so as to exchange a first game source and adjusting the related game data, according to the related database; and (f) judging whether or not the game is to be stop, wherein if it is, then the method goes to an end; and if it is not, then the method goes back to the step of (a).

4. A system for implementing a multi-way game, used to combine a learning software with a game software, so as to allow a user to select an operation on the game software or the learning software, so as to directly or indirectly control a game progress, wherein the game software includes a plurality of game sources, and the learning software includes a plurality of learning courses, the system comprising:

a related database and a transforming unit, wherein the related database further includes a game evaluating module, a learning evaluating module, and a transformation function, wherein the game evaluating module is used to record a source weight representing each of the game sources and the learning evaluating module is used to record a learning weight representing for each of the learning courses, and the source weight and the learning weight have a corresponding relation via the transformation function; and a transformation function unit, used to obtain the learning weight via the learning evaluating module on a learning score that is a result obtained from the learning courses of the learning software, wherein the learning weight is further transformed into the source weight via the transformation function stored in the related database, so as to exchange a game source, wherein in each step of the game progress, the system allows the user to select the operation on the game software or learning software, if the user selects the operation on the learning software, then the learning software provides the learning courses for the user to learn or answer, so that a first learning weight is obtained; and the transforming unit transforms the first learning weight into a first source weight, so as to exchange a first game source and adjust related game data.

5. The system as recited in claim 4, the game software further includes:

a game source database, used to store a plurality of game sources and a game playing rule of the game software;

a game interface, used to receive a game command that is input by the user;

a game processing unit, used to adjust a related game data, according to the game command, and to determine whether or not the game progress is going to stop, according to the game playing rule; and a game information database, used to store a game information.

6. The system as recited in claim 4, wherein the learning software further comprises:

a learning database, used to store the learning courses of the learning software;

a learning interface, used to provide the learning courses for the user to learn or answer;

a learning processing unit, used to produce the score, according to the user to learn and answer, and transmit the score to the transforming unit; and a score database, used to store the score and a learning progress of the user.

7. A method for implementing a multi-way game, used to combine a learning software and a game software, and provide for a user to play a game progress by multiple ways, the method comprising:

dividing the game software into a plurality of game stages, according to a difficulty level or a procedure property of the game software;

determining a source weight for each of a plurality of game sources needed by the game software, so that a game evaluating module is set up;

respectively determining a learning weight, according to a difficulty level of the learning software and a content of the learning software, so that a learning evaluating module is set up;

setting up a related database by using a transformation function to have a corresponding relation, according to the source weight of the game evaluating module and the learning weight of the learning evaluating module, so that the source weight and the learning weight can be exchanged to each other via the related database; and selecting an operation on the game software or the learning software, so as to directly or indirectly control the game progress.

8. The method as recited in claim 7, wherein the learning software includes a learning interface, and the game software further comprises a game interface, wherein the step of selecting the operation on the game software or the learning software, so as to directly or indirectly control the game progress further comprises:

(a) receiving a selection command that is input by the user, wherein if the user selects the operation on the game software, then the step of (b) is performed; and if the user selects the operation on the learning software, then the step of (d) is performed;

(b) activating a game command from the game interface;

(c) adjusting a related game data, according to the game command, and performing the step of (f);

(d) providing for the user about a learning course to learn and answer, so as to produce a first learning weight;

(e) transforming the first learning weight into a first source weight so as to exchange a first game source and adjusting the related game data, according to the related database in correspondence; and (f) judging whether or not the game is to be stop, wherein if it is, then the method goes to an end; and if it is not, then the method goes back to the step of (a).

* * * * *